(12) United States Patent
Sliger, Jr.

(10) Patent No.: US 6,214,217 B1
(45) Date of Patent: Apr. 10, 2001

(54) SKIMMER SCREEN FOR A SWIMMING POOL

(76) Inventor: Leamon V. Sliger, Jr., 4402 Green Shanty Rd., Ooltewah, TN (US) 37363

( * ) Notice: Subject to any disclaimer, the term of this patent is extended or adjusted under 35 U.S.C. 154(b) by 0 days.

(21) Appl. No.: 09/494,165

(22) Filed: Jan. 31, 2000

(51) Int. Cl.[7] .............................. B01D 29/15; E04H 4/16
(52) U.S. Cl. ...................... 210/169; 210/232; 210/242.1; 210/459; 4/490; 4/507
(58) Field of Search .................... 210/169, 232, 210/242.1, 307, 459; 4/490, 496, 507

(56) References Cited

U.S. PATENT DOCUMENTS

| | | |
|---|---|---|
| D. 302,019 | 7/1989 | Dehlen . |
| 2,367,997 | 1/1945 | Chambers . |
| 2,986,232 * | 5/1961 | Wiley ..................................... 210/459 |
| 3,618,774 | 11/1971 | Delphia . |
| 3,868,319 * | 2/1975 | Black et al. .......................... 210/169 |
| 4,140,634 | 2/1979 | Harry . |
| 4,379,749 * | 4/1983 | Roth ..................................... 210/169 |
| 4,501,659 * | 2/1985 | Henk ..................................... 210/169 |
| 4,637,873 * | 1/1987 | DeSousa et al. ..................... 210/232 |
| 4,822,487 | 4/1989 | Soich . |
| 4,836,920 | 6/1989 | Miller, Jr. . |
| 4,913,810 * | 4/1990 | Hodak ..................................... 4/496 |
| 5,285,538 * | 2/1994 | Hodak ..................................... 4/507 |
| 5,759,388 | 6/1998 | Cote . |
| 6,007,714 * | 12/1999 | Keith ..................................... 210/169 |

* cited by examiner

*Primary Examiner*—Christopher Upton

(57) ABSTRACT

A skimmer screen for a swimming pool for preventing the circulating system of the swimming pool from being clogged due to debris and objects. The skimmer screen for a swimming pool includes a mounting bracket which is adapted to securely mount to a side wall of a swimming pool above a skimmer outlet port to the skimmer system; and also includes a supporting frame having an upper portion with a first opening therethrough and having a lower portion with a second opening therethrough and also having a pair of flange members each having a plurality of screen-mounting members securely disposed thereon; and further includes a screen member which is laterally curved and has a plurality of holes spaced along a perimeter of either side of the screen member with the holes being adapted to removably receive the screen-mounting members.

18 Claims, 1 Drawing Sheet

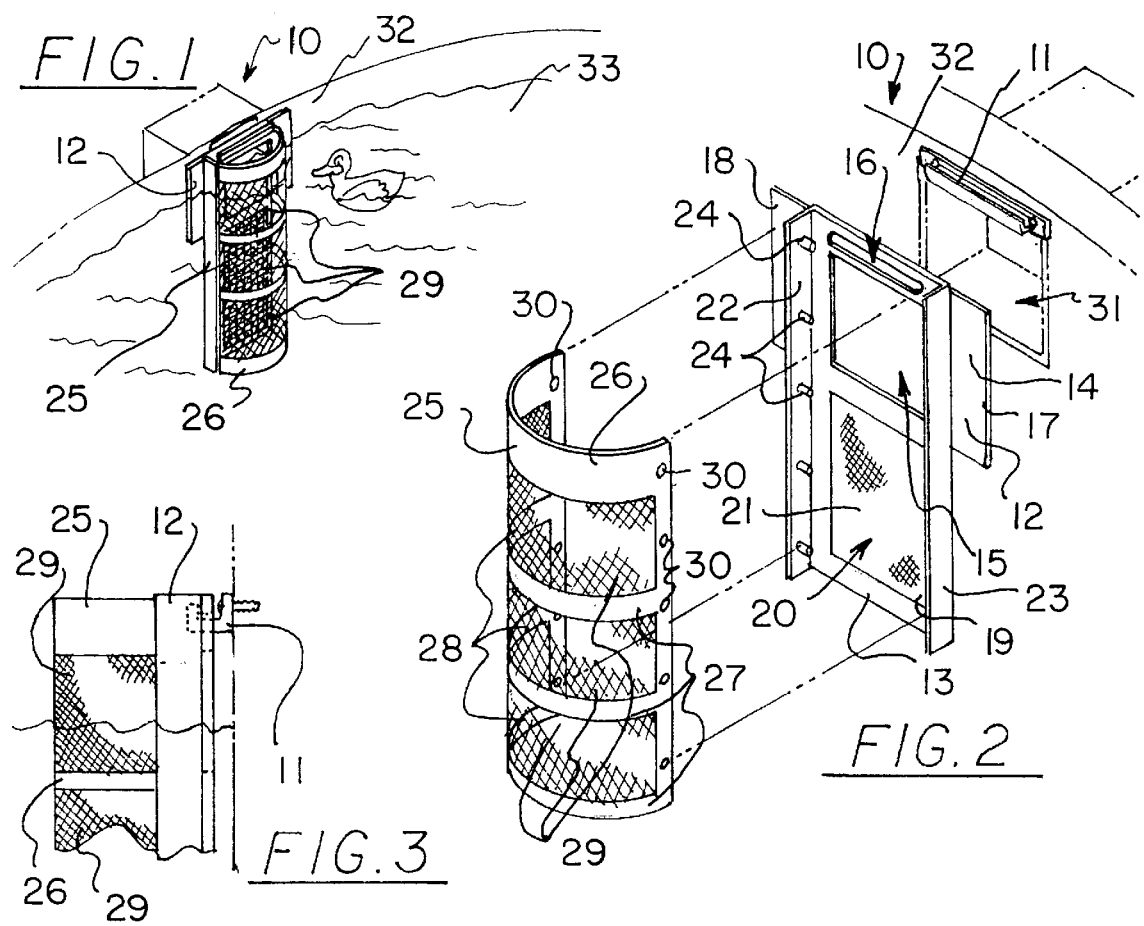
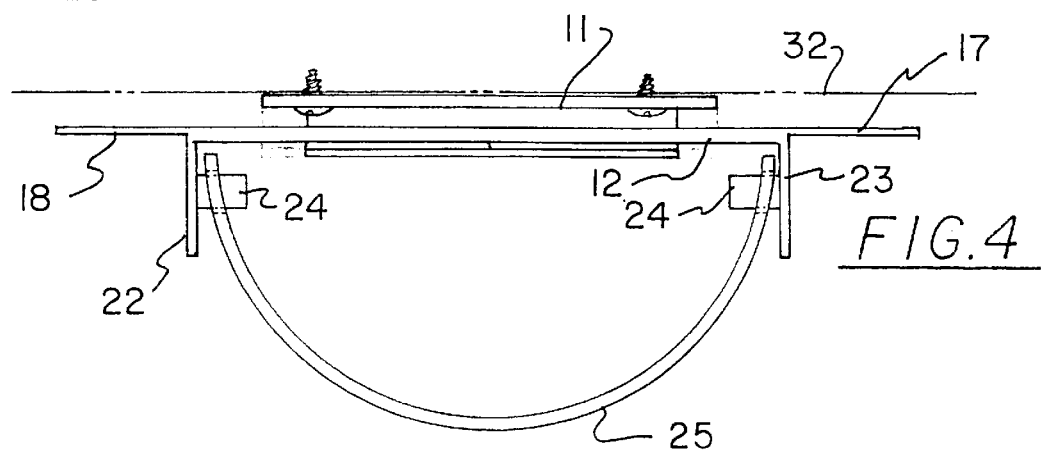

SKIMMER SCREEN FOR A SWIMMING POOL

BACKGROUND OF THE INVENTION

1. Field of the Invention

The present invention relates to a swimming pool skimming screen and more particularly pertains to a new skimmer screen for a swimming pool for preventing the circulating system of the swimming pool from being clogged due to debris and objects.

2. Description of the Prior Art

The use of swimming pool skimming screen is known in the prior art. More specifically, swimming pool skimming screen heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,140,634; 4,836,920; 5,759,388; 2,367,997; 3,618,774; and 4,822,487.

While these devices fulfill their respective, particular objectives and requirements, the aforementioned patents do not disclose a new skimmer screen for a swimming pool. The inventive device includes a mounting bracket which is adapted to securely mount to a side wall of a swimming pool above a skimmer outlet port to the skimmer system; and also includes a supporting frame having an upper portion with a first opening therethrough and having a lower portion with a second opening therethrough and also having a pair of flange members each having a plurality of screen-mounting members securely disposed thereon; and further includes a screen member which is laterally curved and has a plurality of holes spaced along a perimeter of either side of the screen member with the holes being adapted to removably receive the screen-mounting members.

In these respects, the skimmer screen for a swimming pool according to the present invention substantially departs from the conventional concepts and designs of the prior art, and in so doing provides an apparatus primarily developed for the purpose of preventing the circulating system of the swimming pool from being clogged due to debris and objects.

SUMMARY OF THE INVENTION

In view of the foregoing disadvantages inherent in the known types of swimming pool skimming screen now present in the prior art, the present invention provides a new skimmer screen for a swimming pool construction wherein the same can be utilized for preventing the circulating system of the swimming pool from being clogged due to debris and objects.

The general purpose of the present invention, which will be described subsequently in greater detail, is to provide a new skimmer screen for a swimming pool which has many of the advantages of the swimming pool skimming screen mentioned heretofore and many novel features that result in a new skimmer screen for a swimming pool which is not anticipated, rendered obvious, suggested, or even implied by any of the prior art swimming pool skimming screen, either alone or in any combination thereof.

To attain this, the present invention generally comprises a mounting bracket which is adapted to securely mount to a side wall of a swimming pool above a skimmer outlet port to the skimmer system; and also includes a supporting frame having an upper portion with a first opening therethrough and having a lower portion with a second opening therethrough and also having a pair of flange members each having a plurality of screen-mounting members securely disposed thereon; and further includes a screen member which is laterally curved and has a plurality of holes spaced along a perimeter of either side of the screen member with the holes being adapted to removably receive the screen-mounting members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new skimmer screen for a swimming pool which has many of the advantages of the swimming pool skimming screen mentioned heretofore and many novel features that result in a new skimmer screen for a swimming pool which is not anticipated, rendered obvious, suggested, or even implied by any of the prior art swimming pool skimming screen, either alone or in any combination thereof.

It is another object of the present invention to provide a new skimmer screen for a swimming pool which may be easily and efficiently manufactured and marketed.

It is a further object of the present invention to provide a new skimmer screen for a swimming pool which is of a durable and reliable construction.

An even further object of the present invention is to provide a new skimmer screen for a swimming pool which is susceptible of a low cost of manufacture with regard to both materials and labor, and which accordingly is then susceptible of low prices of sale to the consuming public, thereby making such skimmer screen for a swimming pool economically available to the buying public.

Still yet another object of the present invention is to provide a new skimmer screen for a swimming pool which provides in the apparatuses and methods of the prior art some of the advantages thereof, while simultaneously overcoming some of the disadvantages normally associated therewith.

Still another object of the present invention is to provide a new skimmer screen for a swimming pool for preventing the circulating system of the swimming pool from being clogged due to debris and objects.

Yet another object of the present invention is to provide a new skimmer screen for a swimming pool which includes a mounting bracket which is adapted to securely mount to a side wall of a swimming pool above a skimmer outlet port to the skimmer system; and also includes a supporting frame having an upper portion with a first opening therethrough and having a lower portion with a second opening therethrough and also having a pair of flange members each having a plurality of screen-mounting members securely disposed thereon; and further includes a screen member which is laterally curved and has a plurality of holes spaced along a perimeter of either side of the screen member with the holes being adapted to removably receive the screen-mounting members.

Still yet another object of the present invention is to provide a new skimmer screen for a swimming pool that can be conveniently and unobtrusively mounted over the skimmer outlet ports of a swimming pool.

Even still another object of the present invention is to provide a new skimmer screen for a swimming pool that prevents damage to the circulating system of the swimming pool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new skimmer screen for a swimming pool according to the present invention.

FIG. 2 is an exploded perspective view of the present invention.

FIG. 3 is a side elevational view of the present invention.

FIG. 4 is a top plan view of the present invention.

DESCRIPTION OF THE PREFERRED EMBODIMENT

With reference now to the drawings, and in particular to FIGS. 1 through 4 thereof, a new skimmer screen for a swimming pool embodying the principles and concepts of the present invention and generally designated by the reference numeral 10 will be described.

As best illustrated in FIGS. 1 through 4, the skimmer screen for a swimming pool 10 generally comprises a mounting bracket 11 adapted to be securely mounted above a skimmer outlet port 31 in a side wall 32 of a swimming pool 33 with the mounting bracket 11 including an upwardly-turned hook-like member. A supporting frame 12 is removably and securely mounted upon the mounting bracket 11 and being adapted to mount over the skimmer outlet port 31 of a swimming pool 33. The supporting frame 12 includes a plate-like member 13 having an upper portion 14 and a lower portion 19 and further has a first opening 15 disposed through the upper portion 14 and which is adapted to be dimensioned like that of the skimmer outlet port 31 and also having a slot 16 extending through the upper portion 14 near a top thereof and being adapted to removably receive the hook-like member 11 for supporting the supporting frame 12 upon the bracket member 11. The supporting frame 12 further includes a pair of elongate flange members 22,23 integrally extending outwardly of the plate-like member 13 and being spaced apart and disposed to either side of the first opening and extending from a top end to a bottom end of the plate-like member 13. Each of the flange members 22,23 includes a plurality of screen mounting members 24 being securely and conventionally attached to the flange member 22,23 and being spaced along a length thereof. The supporting frame 12 further includes a second opening 20 extending through the lower portion 19 and also includes a mesh material 21 securely and conventionally covering the second opening 20. The upper portion 14 of the plate-like member 13 includes wing portions 17,18 extending from either side thereof and being adapted to rest flush against the side wall 32 of the swimming pool 32 to either side of the skimmer outlet port 31. The screen mounting members 24 are essentially dowel-like members with the supporting frame 12 having length of approximately 20 inches and having a width of approximately 13 inches. A screen member 25 is removably and securely mounted to the supporting frame 12. The screen member 25 includes a frame portion 26 separating the screen member 25 into a plurality of portions 27 with openings 28 through each of the portions 27 with the screen member 25 being generally laterally curved. The screen member 25 includes a plurality of mesh members 29 each of which securely and conventionally covers a respective one of the openings 28 of the screen member 25. The screen member 25 also includes a plurality of holes 30 extending therethrough and being spaced along a perimeter of either side of the frame portion 26. The holes 30 are adapted to removably receive respective dowel-like members 24 for mounting the screen member 25 to the supporting frame 12. The screen member 25 has a length of approximately 20 inches.

In use, either the supporting frame 12 by itself can be used to removably cover the skimmer outlet port 31 in a side wall 32 of a swimming pool 32 or the supporting frame 12 along with the screen member 25 can be mounted over the skimmer outlet port 31 to prevent debris and other objects from clogging the circulating system of the swimming pool 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A skimmer screen for a swimming pool comprising:
a mounting bracket adapted to be securely mounted above a skimmer outlet port in a side wall of a swimming pool;
a supporting frame removably and securely mounted upon said mounting bracket and being adapted to mount over the skimmer outlet port of a swimming pool; and
a screen member removably and securely mounted to said frame;
wherein said mounting bracket includes an upwardly-turned hook-like member; and
wherein said supporting frame includes a plate-like member having an upper portion and a lower portion and further having a first opening disposed through said upper portion and which is adapted to be dimensioned like that of the skimmer outlet port, said upper portion also having a slot extending therethrough near a top end thereof and being adapted to removably receive said hook-like member for supporting said supporting frame, said supporting frame further including a pair of elongate flange members extending outwardly of said plate-like member and being spaced apart and disposed to either side of said first opening and extending from a top end to a bottom end of said plate-like member.

2. A skimmer screen for a swimming pool as described in claim 1, wherein each of said flange members includes a plurality of screen mounting members being spaced along a length thereof.

3. A skimmer screen for a swimming pool as described in claim 2, wherein said screen mounting members are essentially dowel-like members.

4. A skimmer screen for a swimming pool as described in claim 1, wherein said supporting frame further includes a second opening extending through said lower portion and also includes a mesh material securely covering said second opening.

5. A skimmer screen for a swimming pool as described in claim 1, wherein said upper portion of said plate-like member includes wing portions extending from either side thereof and being adapted to rest flush against the side wall of the pool to either side of the skimmer outlet port.

6. A skimmer screen for a swimming pool as described in claim 1, wherein said screen member includes a frame portion separating said screen member into a plurality of portions with openings through each of said portions.

7. A skimmer screen for a swimming pool as described in claim 1, wherein said screen member is essentially laterally curved.

8. A skimmer screen for a swimming pool as described in claim 1, wherein said screen member includes a plurality of mesh members each of which securely covers a respective one of said openings of said screen member.

9. A skimmer screen for a swimming pool as described in claim 1, wherein said screen member includes a plurality of holes extending therethrough and being spaced along a perimeter of either side of said frame portion, said holes being adapted to removably receive respective said dowel-like members for mounting said screen member to said supporting frame.

10. A skimmer screen for a swimming pool comprising:
a mounting bracket adapted to be securely mounted above a skimmer outlet port in a side wall of a swimming pool, said mounting bracket including an upwardly-turned hook-like member;
a supporting frame removably and securely mounted upon said mounting bracket and being adapted to mount over the skimmer outlet port of a swimming pool, said supporting frame including a plate-like member having an upper portion and a lower portion and further having a first opening disposed through said upper portion and which is adapted to be dimensioned like that of the skimmer outlet port, said upper portion also having a slot extending therethrough near a top end thereof and being adapted to removably receive said hook-like member for supporting said supporting frame, said supporting frame further including a pair of elongate flange members extending outwardly of said plate-like member and being spaced apart and disposed to either side of said first opening and extending from a top end to a bottom end of said plate-like member, each of said flange members including a plurality of screen mounting members being spaced along a length thereof, said supporting frame further including a second opening extending through said lower portion and also including a mesh material securely covering said second opening, said upper portion of said plate-like member including wing portions extending from either side thereof and being adapted to rest flush against the side wall of the pool to either side of the skimmer outlet port, said screen mounting members being essentially dowel-like members, said supporting frame having length of approximately 20 inches and having a width of approximately 13 inches; and
a screen member removably and securely mounted to said frame, said screen member including a frame portion separating said screen member into a plurality of portions with openings through each of said portions, said screen member being essentially laterally curved, said screen member including a plurality of mesh members each of which securely covers a respective one of said openings of said screen member, said screen member including a plurality of holes extending therethrough and being spaced along a perimeter of either side of said frame portion, said holes being adapted to removably receive respective said dowel-like members for mounting said screen member to said supporting frame, said screen member having a length of approximately 20 inches.

11. A skimmer screen for a swimming pool comprising:
a mounting bracket adapted to be securely mounted above a skimmer outlet port in a side wall of a swimming pool;
a supporting frame removably and securely mounted upon said mounting bracket and being adapted to mount over the skimmer outlet port of a swimming pool; and
a screen member removably and securely mounted to said frame;
said mounting bracket including an upwardly-turned hook-like member; and
said supporting frame including a plate-like member having an upper portion and a lower portion, a first opening being disposed through said upper portion for communication with the outlet skimmer port, said upper portion also having a slot extending therethrough for removably receiving said hook-like member for supporting said supporting frame on said mounting bracket.

12. A skimmer screen for a swimming pool as described in claim 11, wherein said supporting frame further includes a pair of elongate flange members extending outwardly of said plate-like member and being spaced apart and disposed to either side of said first opening and extending from a top end to a bottom end of said plate-like member.

13. A skimmer screen for a swimming pool as described in claim 12, wherein each of said flange members includes a plurality of screen mounting members being spaced along a length thereof.

14. A skimmer screen for a swimming pool as described in claim 13, wherein said screen mounting members are essentially dowel-like members, said screen member including a plurality of holes extending therethrough and being spaced along a perimeter of either side of said frame portion, said holes being adapted to removably receive respective said dowel-like members for mounting said screen member to said supporting frame.

15. A skimmer screen for a swimming pool as described in claim 11, wherein said supporting frame further includes a second opening extending through said lower portion and also includes a mesh material securely covering said second opening.

16. A skimmer screen for a swimming pool as described in claim 11, wherein said upper portion of said plate-like member includes wing portions extending from either side thereof and being adapted to rest flush against the side wall of the pool to either side of the skimmer outlet port.

17. A skimmer screen for a swimming pool as described in claim 11, wherein said screen member includes a frame portion separating said screen member into a plurality of portions with openings through each of said portions.

18. A skimmer screen for a swimming pool as described in claim 12, wherein said screen member includes a plurality of mesh members each of which securely covers a respective one of said openings of said screen member.

* * * * *